US006580455B1

(12) United States Patent
Wang et al.

(10) Patent No.: US 6,580,455 B1
(45) Date of Patent: Jun. 17, 2003

(54) HIGH DEFINITION IMAGE SENSOR (75) Inventors: Chi-Shin Wang, Los Altos Hills, CA (US); Zhimin Zhou, Santa Clara, CA (US); Li-Yen Shih, Danville, CA (US)

(73) Assignee: Pixart Technology, Inc., Fremont, CA (US)

( * ) Notice: Subject to any disclaimer, the term of this patent is extended or adjusted under 35 U.S.C. 154(b) by 0 days.

(21) Appl. No.: 09/073,128

(22) Filed: May 5, 1998

(51) Int. Cl.[7] ............................. H04N 3/14; H04N 5/335
(52) U.S. Cl. ........................................ 348/308; 348/302
(58) Field of Search ................................ 348/308, 307, 348/302, 301, 303; 250/208.1

(56) References Cited

U.S. PATENT DOCUMENTS

| | | | | |
|---|---|---|---|---|
| 5,077,810 A | * | 12/1991 | D'Luna | 382/323 |
| 5,262,871 A | * | 11/1993 | Wilder et al. | 348/308 |
| 5,452,004 A | * | 9/1995 | Roberts | 348/308 |
| 5,708,263 A | * | 1/1998 | Wong | 250/208.1 |
| 5,949,483 A | * | 9/1999 | Fossum et al. | 348/303 |
| 5,978,025 A | * | 11/1999 | Tomasini et al. | 348/308 |
| 6,115,065 A | * | 9/2000 | Yadid-Pecht et al. | 348/308 |
| 6,320,618 B1 | * | 11/2001 | Aoyama | 348/335 |

* cited by examiner

Primary Examiner—Aung S. Moe
(74) Attorney, Agent, or Firm—Justin F. Boyce; Claude A. S. Hamrick; Oppenheimer Wolff & Donnelly LLP (57) ABSTRACT An improved image sensing array including a semiconductive substrate having formed therein an array of discrete substrate areas organized in rows and columns. The array of areas is segmented into a plurality of blocks, each including a sub-array of the areas. At least one of the rows of each block has at least one reader cell formed therein, and the remaining rows of the block have photosensor cells formed in each area thereof. Each column of each block forms a column block including a plurality of photosensor cells, and a node line communicatively coupling each photosensor cell of the column block to an associated reader cell. A row address line is coupled to each photosensor cell in a particular row of the array. A column bit line is coupled to each reader cell in a particular column of the array. A block select line is coupled to each reader cell in a particular row of the array containing reader cells. In response to row select and block select inputs to the row address lines and the block select lines respectively, image data captured by each the photosensor cell is read out to a corresponding column-bit line through an associated reader cell for input to an output processing means. The output processing means may include a device for interpolating the data state of the image data supplanted by each reader cell of the array.

12 Claims, 10 Drawing Sheets

HIGH DEFINITION IMAGE SENSOR

BACKGROUND OF THE INVENTION

1. Field of the Invention

The present invention relates generally to semiconductor image detection systems. Specifically, the present invention relates to semiconductor image sensing array architectures and related processing methods for achieving high definition image sensing.

2. Description of the Prior Art

Figure 1:
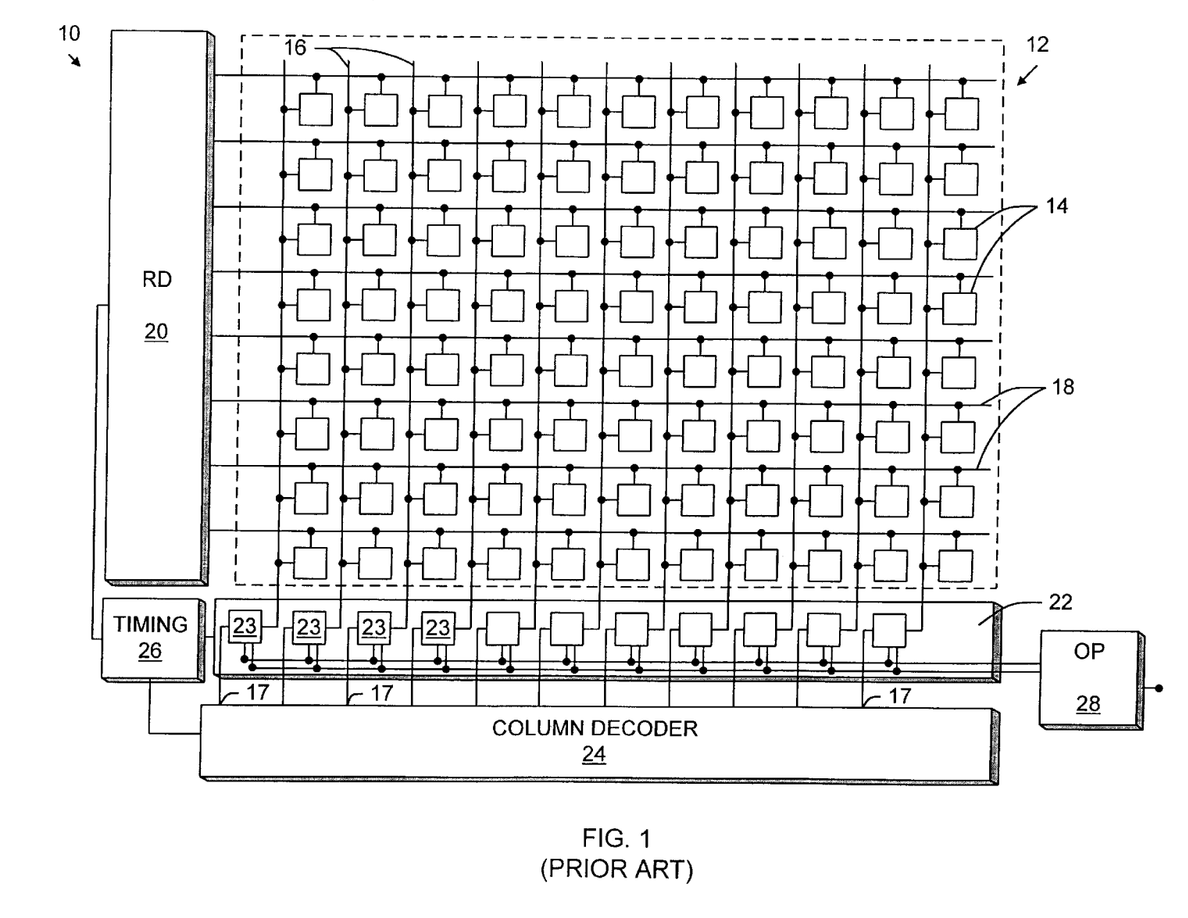
FIG. 1 is a schematic block diagram of a semiconductor image detection system including a prior art image sensing array of pixel unit cells.

Semiconductor type image detection systems are commonly used for sensing images for a wide variety of applications including video systems, surveillance devices, robotics and machine vision, guidance systems, navigation systems, and computer inputs. FIG. 1 shows a schematic block diagram at 10 of a conventional semiconductor image detection system including a prior art image sensing array 12 of pixel unit cells 14 wherein the array includes m column bit lines 16, and n row address lines 18. The system further includes a row decoder 20, a column multiplexer 22 including m column readout circuits 23 coupled to receive data signals from the m column bit lines 16, a column decoder 24 connected to each of the column readout circuits 23 via a corresponding column select line 17, a timing control circuit 26, and an output processing circuit 28.

Each of the cells 14 includes a row address switch (not shown) coupled to receive a row address signal from row decoder 20 via a corresponding row address line 18. Each of the readout circuits 23 includes a column select switch (not shown) which is coupled to receive a column select signal from column decoder 24 via a corresponding column select line 17. Timing control circuit 26 provides timing control signals to row decoder 20, column decoder 24, and column multiplexer 22 for controlling operations of the system related to capture, flow, and processing of image data.

Each of the cells 14 includes an optical sensing element capable of detecting illumination at the coordinate location of array 12 at which the cell is disposed. Optical sensing elements commonly used in semiconductor arrays include charge coupled devices (CCD's), photodiodes, pinned photodiodes, photogates, phototransistors, and charge injection devices. Typically, each cell is adapted to alternate between a light sensing mode wherein the cell outputs an image signal proportional to light detected by the optical sensing element and a reset mode wherein the cell may output a reset reference signal. The image signals and the reset reference signals comprise data signals which are provided to the column readout circuits 23 via the column bit lines 16.

A problem with image sensing using array 12 is that the voltage levels of the image signals provided by each cell 14 are small and sensitive to noise coupling and fixed pattern noise (FPN) caused by sensing amplifiers in the column readout circuits 23. Attenuation and noise problems increase as the number of cells 14 in array 12 increases because a larger sensing array requires longer column bit lines 16 for intercoupling the cells to the column readout circuits 23.

A pixel unit cell 14 may be either active or passive. In conventional passive pixel image sensor (PPS) systems, each of the cells 14 is a passive pixel unit cell (PPS cell) which includes an optical sensing element and electronic switching components for selectively coupling image signals between the optical sensing element and a sensing amplifier of a corresponding column readout circuit. In conventional active pixel image sensing (APS) systems, each of the cells 14 is an active pixel unit cell (APS cell) which includes active electronic components in addition to an optical sensing element and electronic switching components. The active electronic components such as, for example, source follower transistors in APS cells provide amplification of image signals generated by the optical sensing elements.

If PPS cells are employed as the pixel unit cells 14 in the image sensing array 12, each of the column bit lines 16 forms a sensing node for those cells 14 coupled to the column bit line. As the length of each of the column bit lines 16 increases, the parasitic capacitance of the column bit lines increases causing a decrease in the sensitivity of the image detecting system to light incident on the cells coupled to the column bit lines. As a result of increased parasitic capacitance, the data signals are attenuated and distorted as they are transmitted from the cells to the readout circuits 23 via the column bit lines. In other words, increased parasitic capacitance of the sensing nodes causes decreased voltage gain of the sensing nodes.

PPS technology provides advantages in fabrication over APS technology because the lithography process for fabricating sensing arrays using PPS cells is simple and manufacturing yield tends to be higher. PPS cells require less integrated circuit area, or chip real estate, than APS cells because PPS cells do not require the active electronic components that APS cells require.

APS technology provides performance advantages including increased sensitivity and immunity from noise. The active components in APS cells provide amplification of the data signals generated by the optical sensing elements. This amplification provides maintenance of image signal integrity as image signals propagate through longer column bit lines 16 in larger sensing arrays from the cells to the column readout circuits.

An additional advantage of APS technology is that the sensing node of each APS cell is isolated from the corresponding column bit line. Smaller sensing nodes have lower parasitic capacitance and therefore higher voltage gain. Also, the sensing nodes of APS cells allow for less cross coupling from other signal lines and are less sensitive to column circuit fixed pattern noise (FPN) than sensing nodes of PPS cells. Furthermore, the smaller sensing nodes of APS cells allow for lower kTC noise which is proportional to the number of electrons stored in the image sensing element of the cell. The kTC noise is proportional to the square root of the product, kTC. So it is desirable to minimize the size of sensing nodes of an image sensing array in order to minimize noise and maximize sensitivity. As discussed, this is commonly achieved by minimizing the size of an image sensing array.

It is also desirable to minimize the physical size of an image sensing array for ease of manufacturing, manufacturing yield, and portability. However, a conflicting goal in design of image detectors is to maximize the number of cells in the image sensing array because the definition, or resolution, of a detected image is a function of the number of pixels used to form the image. The overall size of an image sensing array depends on the number of cells in the array and the size of each cell in the array. Therefore it is desirable to increase the number of cells per unit area of an array by reducing the size of each pixel unit cell in order to maximize pixel density.

Fabrication of an APS cell using standard metal oxide semiconductor (MOS) technology typically requires an area which is approximately 10 μm×10 μm in size. Therefore, fabrication of an image sensing array having 4×10⁶ pixels using standard MOS technology typically requires an area of approximately 2 cm×2 cm. Due to integrated circuit manufacturing yield problems, fabrication of a 2 cm×2 cm chip is not very practical. Using complementary metal oxide semiconductor (CMOS) technology, it is possible to fabricate an APS cell having an area which is approximately 5 μm×5 μm in size. Fabrication of an image sensing array having 4×10⁶ pixels using 0.5 μm CMOS technology requires an area of approximately 400×300 mils.

In summary, while APS cells provide increased sensitivity and immunity to noise, it is difficult to achieve high pixel density image sensing arrays using APS technology because APS cells require a large integrated circuit area. PPS technology allows for fabrication of image sensing arrays which have high pixel density but are sensitive to noise problems.

SUMMARY OF THE INVENTION

It is therefore an object of the present invention to provide a semiconductor image detection system including a high density image sensing array of pixel unit cells wherein integrity of image data is not substantially degraded by parasitic capacitance and noise of sensing nodes.

Another object of the present invention is to provide a system of the type described wherein the sensing array is subdivided into area components in which groups of cells are communicatively coupled to the column bit lines through common connections.

Another object of the present invention is to provide a system of the type described wherein the cell data from cells within predetermined groups of cells are read out to column bit lines through shared amplifying circuits Briefly, a presently preferred embodiment of the present invention includes an image sensing array of photo responsive semiconductor cells that is segmented into blocks of cells, with each column of cells within each block including a reader cell connected to each sensing cell in the column block and adapted to selectively communicate image data to an associated column bit line via an amplifier means formed within the reader cell.

An important advantage of this invention is that since photo cell signals are amplified before they are output to a column bit line, substantial improvement in signal to noise ratio can be obtained over conventional image sensing arrays using passive pixel sensing technology. Another advantage is that the sensing cells used in the present invention do not include amplifiers and therefore enable higher cell density and resulting higher image sensitivity and definition than conventional image sensing arrays using active pixel sensing technology.

DETAILED DESCRIPTION OF THE PREFERRED EMBODIMENTS

Figure 2:
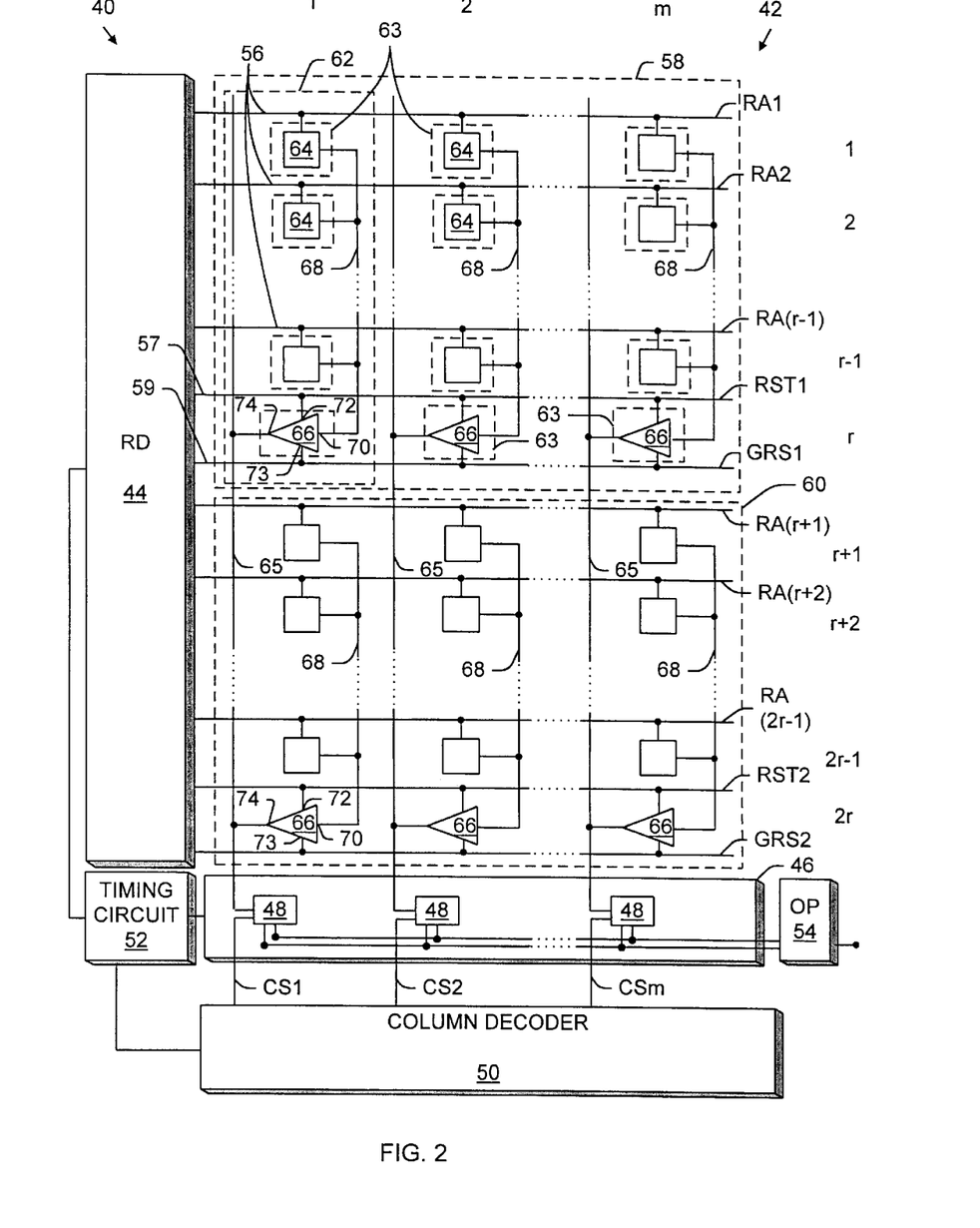
FIG. 2 is a schematic block diagram generally illustrating a high definition semiconductor image detection system including a segmented image sensing array architecture according to the present invention.

FIG. 2 is a schematic block diagram generally illustrating at 40 a high definition semiconductor image detection system formed on a single semiconductor chip according to principles of the present invention. The system includes an image sensing array 42, a row decoder 44, a column multiplexer 46 including a plurality of column readout circuits 48, a column decoder 50, a timing control circuit 52, and an output processing circuit 54 coupled to receive data signals from column readout circuits 48. Each of the readout circuits 48 includes a column select switch (not shown) which is coupled to receive a column select signal from column decoder 50 via a corresponding column select line 55 designated CS1–CSm. Timing control circuit 52 provides timing control signals to row decoder 44, column multiplexer 46, and column decoder 50 for controlling operations related to capture, flow, and processing of image data. Array 42 includes n row address lines 56 designated RA1–RAn.

In general, the image sensing array 42 in accordance with a preferred embodiment of the present invention is segmented into an integer number of blocks (chip areas) 62 each including "r" "block rows" (wherein r<=n) and "s" "block columns", (wherein s<=m), of smaller chip areas 63 with each area 63 being disposed at a predetermined coordinate location in a regular matrix. In the depicted embodiment, array 42 is, for purposes of illustration, segmented into a first block 58 and a second block 60 each including a plurality of the uniformly sized and spaced areas 63. In an actual implementation, the array 42 would normally be segmented into a much larger number of blocks. Each of the blocks 58 and 60 include "r" rows and m columns of areas 63. For purposes of description, each column of areas within a block will be called a "block column" 62. In the depicted embodiment, the r–1 rows of areas 63 are occupied by optical sensing cells 64 which include optical sensing elements (not shown) capable of detecting light incident on the area in which the cell is disposed. The remaining row of areas 63 of each block column 58, 60 is occupied by a "block reader" cell 66 which does not include an optical sensing element but instead includes an electronic amplifying element which, as will be further described, selectively couples data signals from the cells 64 of the corresponding block column to the corresponding column bit line 65. As will be described further below, since the block reader cells 66 occupy areas within array 42 which do not include optical sensing elements, these areas form interstitial rows of image sensing array 42 at which no illumination is measured.

In this embodiment, each of the optical sensing cells 64 is a passive pixel unit cell (PPS cell) of minimal size. PPS cells are preferred in the present invention because they can be fabricated using minimal chip area and thus achieve maximum pixel density in the array in order to generate high definition image data.

Each row of optical sensing cells 64 is coupled to a row address line 56 adapted to receive a row address signal RA from row decoder 44. Each block column 62 includes one or more conductive lines forming a "sensing node" 68 that couples each optical sensing cell 64 of the block column to the input of the included reader cell 66. Each block reader cell 66 includes: a data input 70 connected to the corresponding sensing node 68 to receive data signals from the optical sensing cells 64 of the block column; a reset input 72 connected to a corresponding row select reset line 57 to receive a reset signal RST from row decoder 44; a group row select input 73 connected to a group row address line, or block select line, 59 to receive a group row select signal, or block select signal, GRS from row decoder 44; and a data output 74 connected to a corresponding column bit line 65 to provide an amplified data signal to a corresponding column readout circuit 48. Each of the group row select lines is unique to a particular block or set of blocks of the array and is used in combination with row address signals RA to select a particular block or blocks of pixel unit cells for data output.

Readout circuits 48 sample the amplified data signals and generate image data corresponding to each of the optical sensing cells 64. Each of the readout circuits 48 is coupled to receive a column select signal from column decoder 50 via a corresponding column select line 55 designated CS1–CSm. The image data from each cell is read out from each cell 64 in much the same manner as in other similar devices except that in this case, data from each cell in a particular block column is amplified before being coupled to its corresponding column bit line 65. The data is read out line by line and coupled via column multiplexer 46 to output signal processing circuit 54 which includes interpolation means for generating interpolated image data to fill in each interstitial area of array 42 occupied by a block reader cell 66. The interpolated image data is determined as a function of measured image data corresponding to predetermined areas of array 42 which are in close proximity to the interstitial area.

Figure 3:
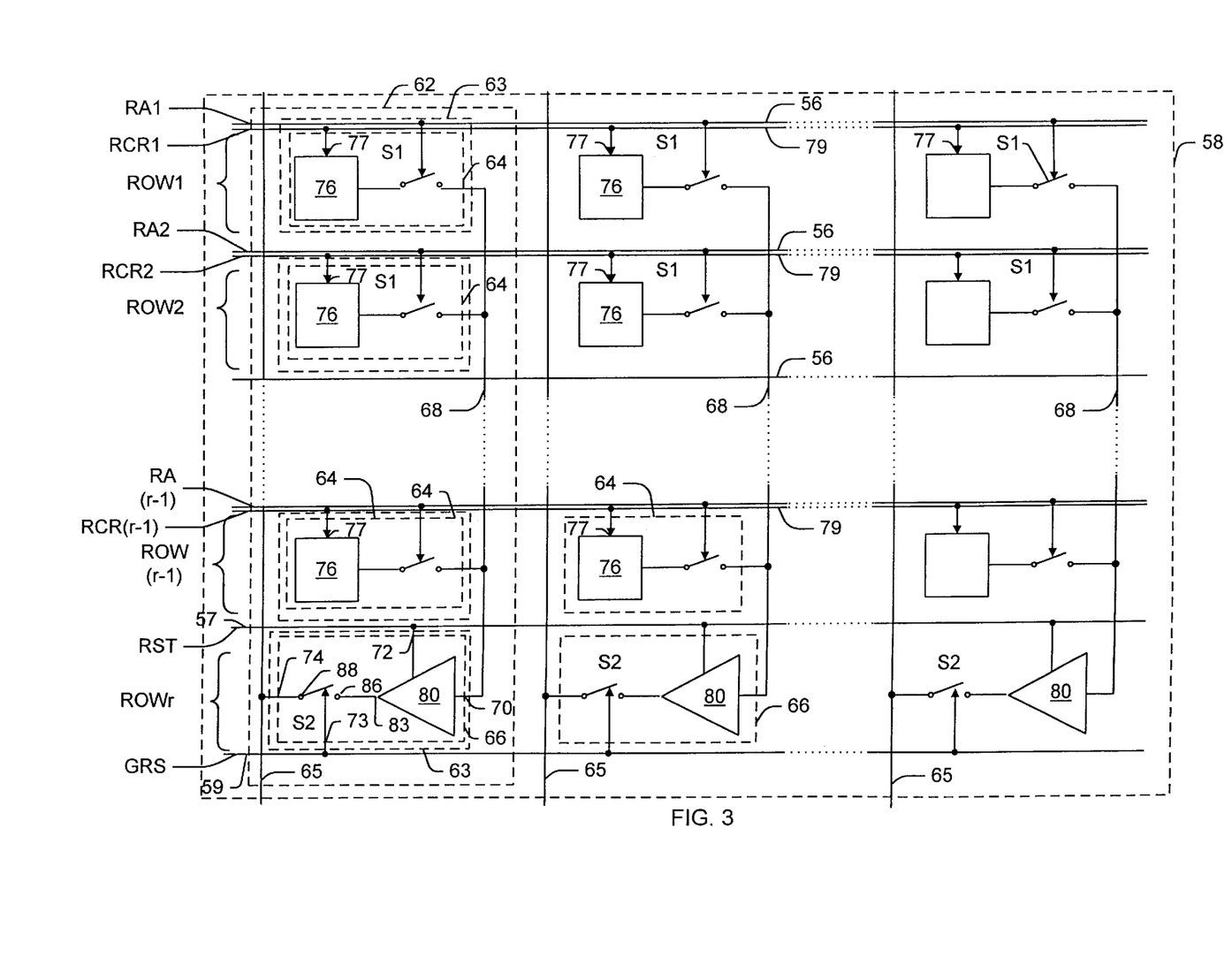
FIG. 3 is a schematic block diagram illustrating in more detail the structure of a particular block of the segmented image sensing array illustrated in FIG. 2.

FIG. 3 is a schematic diagram illustrating in somewhat more detail an embodiment of the blocks 58, 60 of the array 42 illustrated in FIG. 2. The dashed boxes correspond to the like numbered chip areas or elements shown in FIG. 2. Each of the optical sensing cells 64 is formed by an optical sensing element 76, and a switch S1 having a first terminal connected to the sensing element 76 and a second terminal connected to a corresponding sensing node 68. The actuating input of switch S1 is connected to a corresponding row address line 56 and is responsive to a corresponding row address signal RA provided by row decoder 44 (FIG. 2) via the corresponding row address line 56. Each optical sensing element 76 may be formed by a photodiode, a pinned photodiode, a photogate, a phototransistor, a charge injection device, or any other suitable optical sensing device. In a particular embodiment of the present invention, each of the optical sensing cells 64 is adapted to alternate between a light sensing mode wherein the cell outputs an image signal proportional to the detected light, and a reset mode wherein the cell outputs a reset reference signal. Each of the optical sensing elements 76 of each row includes a cell reset input 77 connected to a corresponding row cell reset line 79 and is responsive to a corresponding row cell reset signal RCR1–RCR (r–1) provided by row decoder 44 (FIG. 2) via the corresponding row cell reset line 79. The process of resetting each of the optical sensing elements 76 of each row, in response to the corresponding row cell reset signal, provides an electronic rolling shutter mechanism. Alternatively, a mechanical shutter may be used with an image detection system of the present invention.

Each of the depicted block reader cells 66 includes an amplifier 80 having: a data input 70 connected to a corresponding sensing node 68 to receive the data signals from optical sensing cells 64; a reset input 72 connected to a corresponding row select reset line 57 via reader cell reset input 72 to receive a reset signal RST from row decoder 44; and a data output 83. Each of the cells 66 also includes a block column select switch S2 having a first terminal 86 connected to data output 83, and a second terminal 88 connected via a reader cell output 74 to a corresponding column bit line 65. The activating input of each switch S2 is connected to a corresponding group row address line and is responsive to the group row select signal GRS provided by row decoder 44 (FIG. 2). In operation, each switch S2 selectively provides an amplified data signal from amplifier 80 to a corresponding column readout circuit 48 (FIG. 2) via a corresponding column bit line 65.

Figure 4:
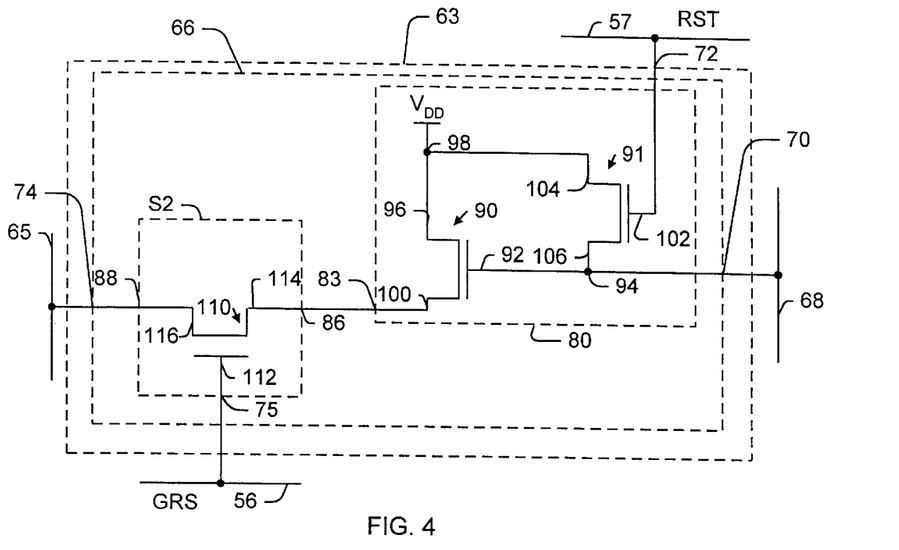
FIG. 4 is a schematic diagram depicting a particular embodiment of a block column reader cell of the segmented array depicted in FIG. 2.

FIG. 4 is a schematic diagram depicting a particular embodiment of a block column reader cell 66 of the segmented array 42 depicted in FIG. 2 according to the present invention. The dashed boxes correspond to the like numbered chip areas and elements shown in FIGS. 2 and 3. The depicted block reader cell 66 includes the amplifier 80 and switch S2 implemented using CMOS technology. Amplifier 80 is formed by a source follower transistor 90 and a reset transistor 91. Transistor 90 has its gate 92 connected via input 70 to block column node 68, its source 96 connected to a voltage source $V_{DD}$, and its drain 100 connected to the first terminal 86 of switch S2 via the data output 83 of amplifier 80. Reset transistor 91 has its gate 102 connected to a corresponding reset line 57 via reader cell reset input 72 to receive the reset signal RST from row decoder 44 (FIG. 2), its source 104 connected to $V_{DD}$ via circuit node 98, and its drain 106 connected to gate 92 via a circuit node 94. Data signals from the optical sensing cells 64 (FIG. 3) are input via node 68.

The switch S2 is formed by a group select transistor 110 having its gate 112 connected a corresponding row address line 56 to receive the group row select signal GRS provided by row decoder 44 (FIG. 2), its source 114 connected to the data output 83 of the amplifier 80 via first terminal 86, and its drain connected to a corresponding column bit line 65 via second terminal 88. When actuated by a GRS signal on line 56 switch S2 is operative to couple an amplified data signal to a column readout circuit 48 (FIG. 2).

Figure 5:
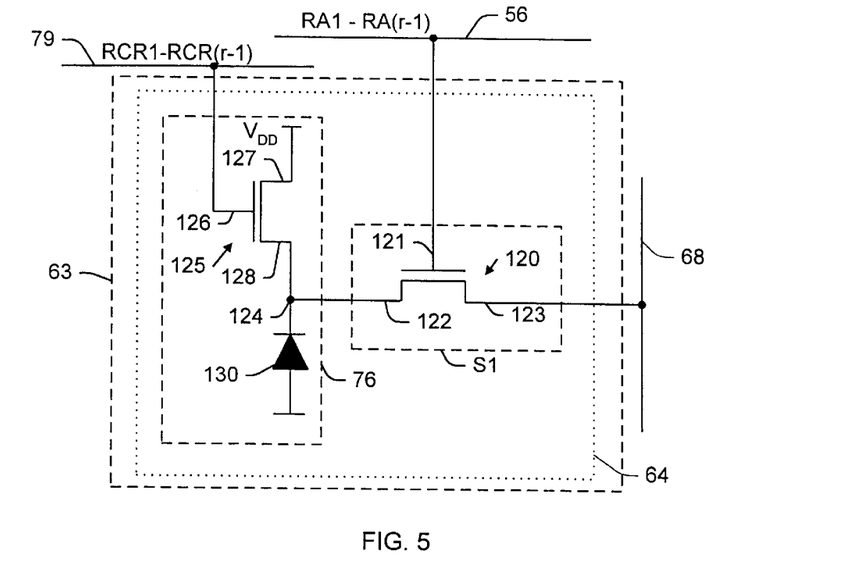
FIG. 5 is a schematic diagram depicting a particular embodiment of an optical sensing cell of the segmented array depicted in FIG. 2.

FIG. 5 is a schematic diagram depicting a particular embodiment of the optical sensing cell 64 depicted in FIGS. 2 and 3. The dashed boxes correspond to the like numbered chip areas and elements shown in FIGS. 2 and 3. The depicted cell 64 includes the switch S1 and the optical sensing element 76. Switch S1 is formed by a row address transistor 120 having its gate 121 connected to a corresponding row address line 56 to receive a corresponding row address signal RA, its source 122 connected to the output of the optical sensing element 76 at a node 124, and its drain 123 connected to a corresponding block column output node 68. The depicted optical sensing element 76 includes: a photo-diode 130, of a type mentioned above, having its output connected to node 124; and a reset transistor 125 having its gate 126 connected to a corresponding row cell reset line 79 to receive a corresponding row cell reset signal RCR1–RCR (r–1), its source 127 connected $V_{DD}$, and its drain 128 connected to node 124.

Figure 6:
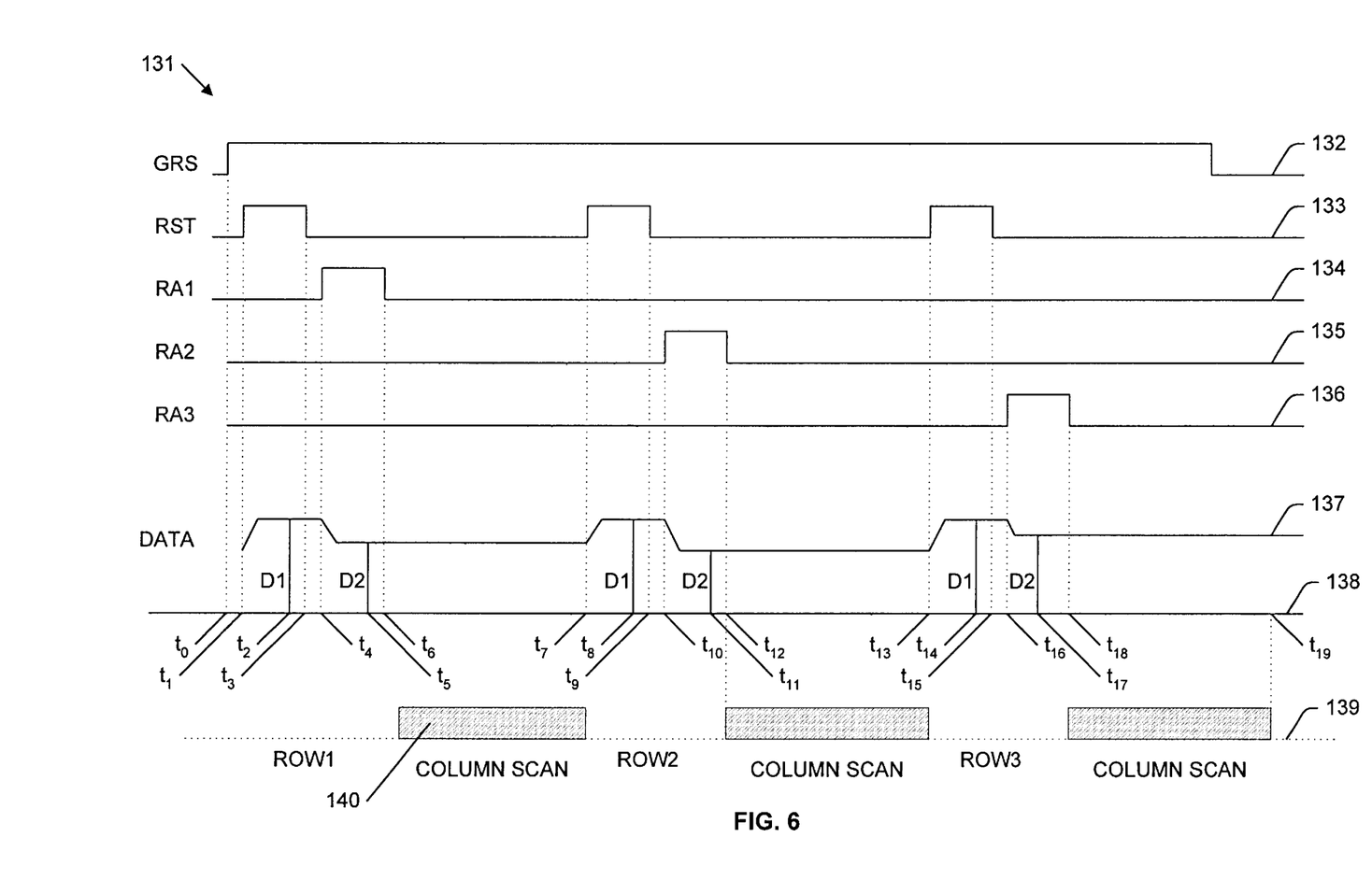
FIG. 6 is a timing diagram illustrating the timing of control signals used in a readout process performed by the image detection system of FIG. 2 for reading data signals from the image sensing array of FIG. 2.

FIG. 6 shows a timing diagram at 131 illustrating the timing of control signals used in a process, performed by the image detection system shown at 40 (FIG. 2), of reading data signals from the image sensing array 42 (FIG. 2). Waveform 132 represents the group row select signal GRS1 provided by row decoder 44 (FIG. 2) to block reader cells 66 of the first block 58 (FIG. 2) of the image sensing array. Waveform 133 represents the reset signal RST1 provided by the row decoder to the block reader cells of the first block of the image sensing array for resetting the amplifiers 80 (FIG. 3) of the block reader cells. Waveform 134, 135, and 136 represent row address signals RA1, RA2, and RA3 provided by the row decoder respectively to the first, second, and third rows of optical sensing cells 64 (FIG. 2) of the first block of the image sensing array. Waveform 137 represents a data signal DATA provided via column bit lines 65 (FIG. 2) from the $i^{th}$ column of optical sensing cells to column readout circuits 48 (FIG. 2) of the column multiplexer 46. The data signal includes image data and reset reference data, as explained further below, which is provided to output processing circuit 54 (FIG. 2) from the column readout circuits 48. The timing diagram at 131 further includes a time line 138 and a column scanning line 139 illustrating time intervals during which column bit lines 65 are selected for data output via column select signals asserted by column decoder 50 (FIG. 2).

In operation, at a time to, the group row address signal GRS1 (waveform 132) steps to a HIGH state to select the block reader cells of the first block 58 (FIG. 2) of the array. At a time $t_1$, the reset signal RST (waveform 133) steps to a HIGH state to reset the amplifiers 80 (FIG. 3) of the block reader cells of the first block. When the reset signal RST steps to the HIGH state, reset transistor 91 (FIG. 4), which has its gate connected to receive the reset signal RST via reset line 57, turns ON and the voltage level at node 94 (FIG. 4) is pulled up towards $V_{DD}$ thereby raising the voltage level at the gate 92 of source follower transistor 90 which causes the voltage level at output 74 (FIG. 4) of the reader cell to increase. At a time $t_3$, the reset signal RST (waveform 133) steps to a LOW state causing reset transistor 91 (FIG. 4) to turn OFF. During the time interval between time $t_1$ and time $t_3$ with the block reader cells 66 of the first block selected and set in the reset mode, a reset reference level, D1, for the block reader cell 66 of each column of the first block is sequentially provided to the corresponding column readout circuit 48 (FIG. 2) via the corresponding column bit lines 65. Reset reference data from the block reader cell of each column of the first block is stored by the corresponding readout circuit 48. At an exemplary time $t_2$, the data signal DATA (waveform 137) is shown at a level representative of the reset reference level, D1, for block reader cell 66 of the $i^{th}$ column.

At a time $t_4$, row address signal RA1 (wave form 134) steps to a HIGH state to close the switches S1 (FIG. 3) of each optical sensing cell 64 of the first row ROW1 of the block thereby providing a signal path between each of the corresponding optical sensing elements 76 (FIG. 3) and the corresponding block reader cells 66 via the corresponding sensing nodes 68. At a time $t_6$, row address signal RA1 (wave form 134) steps to a LOW state to open the switches S1 (FIG. 3) of each optical sensing cell 64 of the first row ROW1. During the time interval between time $t_4$ and time $t_6$ with the first row selected, image signals from each optical sensing element in the first row are amplified by the block reader cell of the corresponding column and provided to the corresponding column readout circuit 48 (FIG. 2) via the corresponding column bit line 65. At an exemplary time $t_5$, the data signal (waveform 137) is shown at an image signal level, D2, which is proportional to the light incident on the optical sensing element of the $i^{th}$ column of the first row. Subsequent to time $t_6$, and before a time $t_7$, column scanning of ROW1, represented by the column scanning "windows" 140 in line 139, is implemented by outputting the data stored in each of the column readout circuits 48 (FIG. 2) to the output processing circuit 54 (FIG. 2).

In a time interval between time $t_7$ and time $t_{15}$, data signals are read from the optical sensing cells of the second row ROW2 (FIG. 3) of the first block of the image sensing array as row address signal RA2 and reset signal RST change states in the same manner as described above in reference to reading out data from the cells of the first row. Likewise, in a time interval between time $t_{13}$ and time $t_{19}$, data signals are read from the cells of the third row ROW3 (FIG. 3) of the first block of the image sensing array, etc. The readout process continues in the same manner to read data signals from each row of each block of cells of the image sensing array 42 (FIG. 2).

Figure 7A:
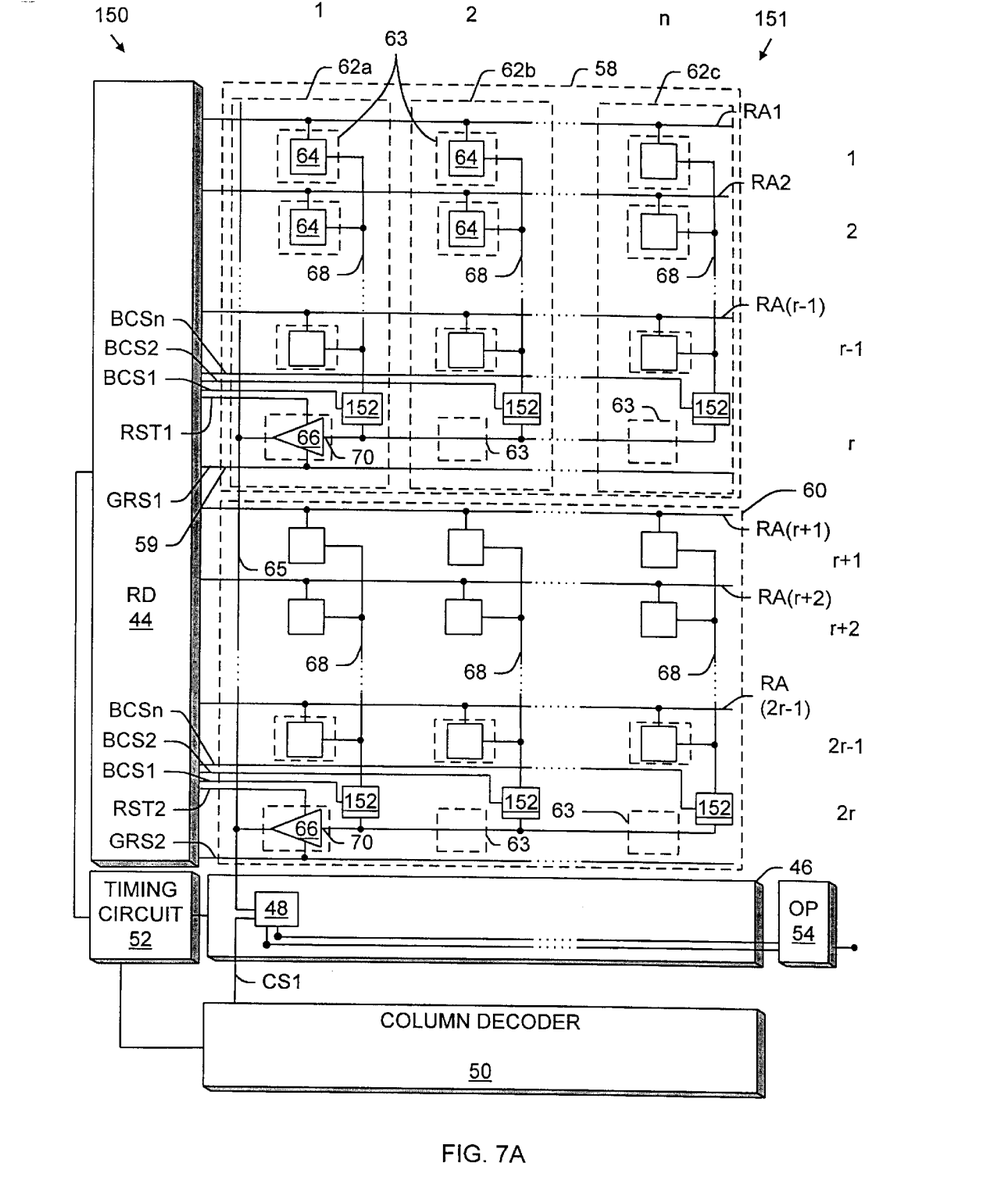
FIG. 7A is a schematic block diagram generally illustrating an alternative embodiment of the image detection system of FIG. 2 according to the present invention.

FIG. 7A is a schematic diagram illustrating an alternative embodiment at 150 of the semiconductor image detection system wherein the depicted dashed boxes and elements correspond to the like numbered chip areas and elements shown in FIG. 2. The depicted image detection system is essentially the same as the image detection system depicted at 40 (FIG. 2) except that the data signals from multiple block columns 62 of optical sensing cells is provided to and amplified by a single reader cell 66. This is to say that data from groups of block columns within the blocks 58, 60 will be read out to corresponding column bit lines through corresponding individual reader cells of which, for simplicity, only one such group is depicted in each of the blocks 58, 60. It will, of course, be appreciated that multiple replications of such groups of block columns, and corresponding column bit lines not shown in this simplified example, will be included in an actual device. In the depicted embodiment, only one of the chip areas 63 of the interstitial row of each block 58, 60 includes a reader cell 66 and the remaining chip areas 63 of the group are unoccupied. In general, the area occupied by a reader cell 66 may be expanded to cover a plurality of the chip areas 63 of the interstitial row.

Each block column 62 includes a block column select switch 152 having: a first terminal connected to a sensing node 68; a second terminal connected to the data input 70 of a block reader cell 66; and an actuating input coupled to receive a block column select signal BCSi from row decoder 44. More specifically, data from a cell in a selected row of first block column 62a is coupled to the first reader cell 66 by the first switch 152 in response to a first block column select signal BCS1 generated by the row decoder 44. Similarly, data from a cell in the selected row of the second block column 62b is thereafter coupled to the input of the first reader cell by a second switch 152 in response to a second block column select signal BCS2 until the entire row of cells is read out. The block column select signals BCS1–BCSn are provided at the cost of an additional layer of multiplexing provided by row decoder 44. The principal advantage of this embodiment is that the number of block reader cells 66 required in the image sensing array at 151 is reduced.

Figure 7B:
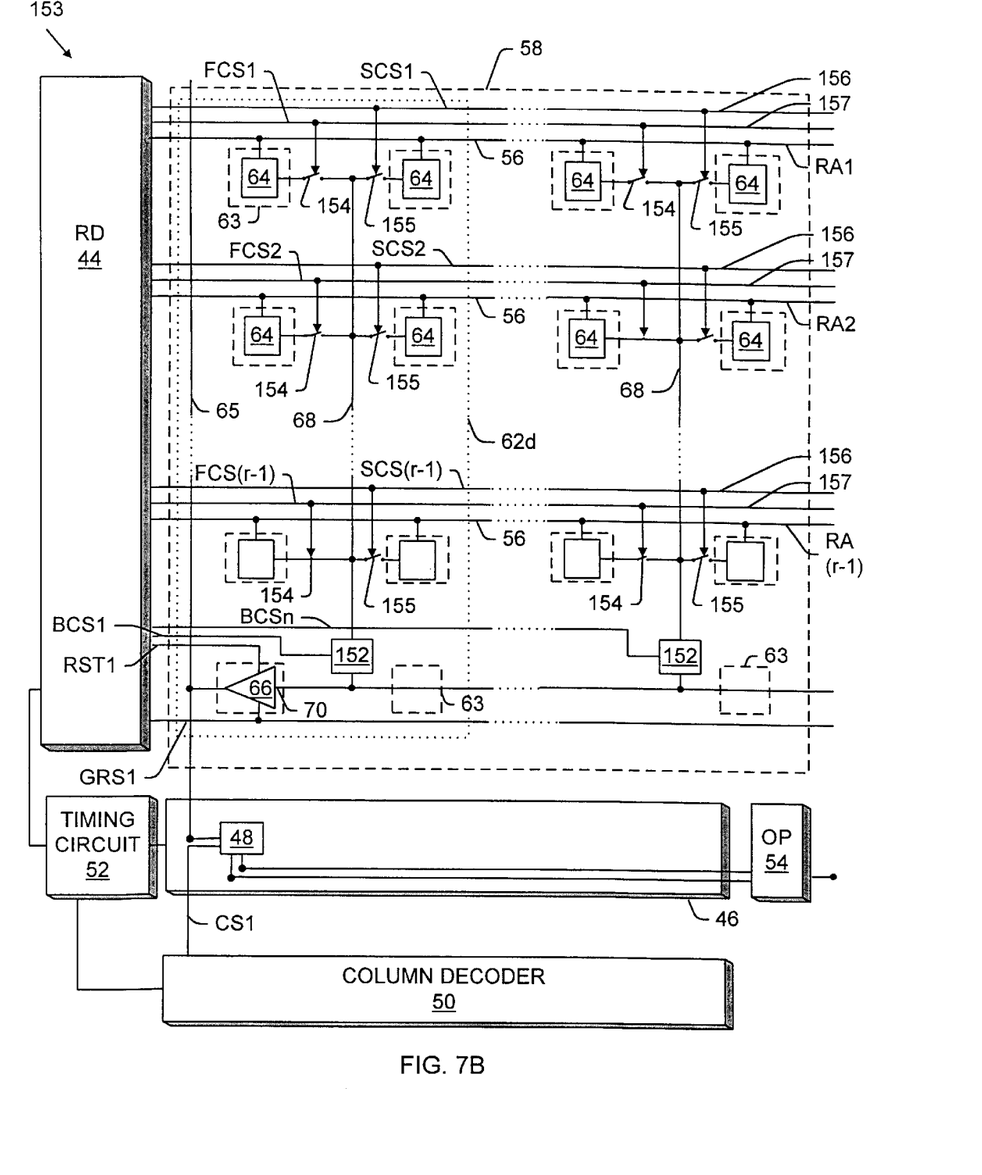
FIG. 7B is a schematic block diagram generally illustrating another alternative embodiment of the image detection system of FIG. 2 according to the present invention.

FIG. 7B is a schematic diagram illustrating another alternative embodiment at 153 of the semiconductor image detection system wherein the depicted dashed boxes and elements correspond to the like numbered chip areas and elements shown in FIG. 2. The depicted image detection system is essentially the same as the image detection system depicted at 150 (FIG. 7A) except that the data signals from each pair 62d of block columns 62 (FIG. 7A) of optical sensing cells is provided to a reader cell 66 via a single sensing node 68. This is to say that data from groups of multiple block column pairs 62d, each pair sharing a single corresponding sensing node 68, will be read out to corresponding individual reader cells of which, for simplicity, only one such group is depicted in each of the blocks 58, 60. It will, of course, be appreciated that multiple replications of such groups of block column pairs 62d, and corresponding reader cells not shown in this simplified example, will be included in an actual device.

In the depicted embodiment, each block column pair 62d includes a pair of block columns 62 (FIG. 7A) of optical sensing cells 63, a sensing node 68, and a block column select switch 152 having a first terminal connected to the sensing node, a second terminal connected a block reader cell 66, and an actuating input coupled to receive a block column select signal BCSi from row decoder 44. Each block column pair 62d includes (r−1) rows of optical sensing cells, each row including a first optical sensing cell 63 selectively coupled to the corresponding sensing node 68 via a switch 154 and a second optical sensing cell selectively coupled to the corresponding sensing node via a switch 155. Each switch 154 of each row of each block column pair 62d includes an actuating input connected to a corresponding first cell select line 156 to receive a corresponding first cell select signal FCS1–FCS(r−1) from row decoder 44. Each switch 155 of each row of each block column pair 62d includes an actuating input connected to a corresponding second cell select line 157 to receive a corresponding second cell select signal SCS1–SCS (r−1) from row decoder 44.

More specifically, data from the first and second cells in a selected row of a block column pair 62d is coupled to the corresponding sensing node 68 by switches 154 and 155 respectively in response to corresponding first and second cell select signals generated by the row decoder 44. The first and second cell select signals FCS1–FCS(r−1) and SCS1–SCS(r−1) are provided at the cost of an additional layer of multiplexing provided by row decoder 44. The principal advantage of the depicted embodiment is that the number of block reader cells 66 and the number of sensing nodes 68 required in the image sensing array at 151 is reduced thereby allowing for increased density of optical sensing cells in the image sensing array.

Figure 8:
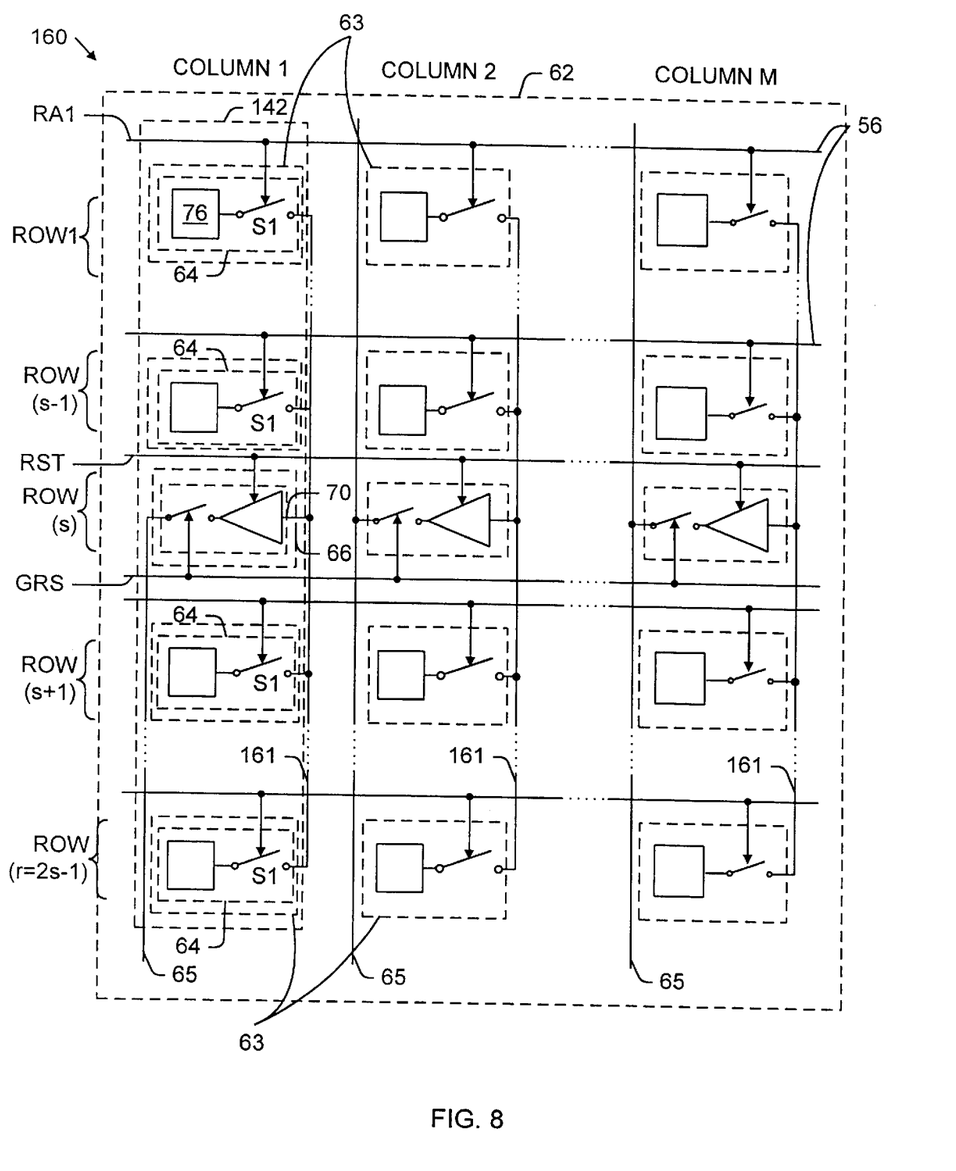
FIG. 8 is a schematic block diagram generally illustrating an alternative embodiment of a segmented image sensing array block according to the present invention.

FIG. 8 is a schematic diagram illustrating another alternative embodiment at 160 of a segmented image sensing array according to the present invention. As described above, an array block according to one embodiment of the present invention includes a plurality of predetermined chip areas 63 disposed at coordinate locations in a regular (rxm) matrix, with one of the rows of the block containing group reader cells while all other rows are comprised of image sensing cells.

This first alternative block embodiment is essentially the same in size and number of cells as those described above except that instead of having the last row "r" of said cells in the block configured as reader cells, in this block, the middle row "s" of cells within the block is constituted of reader cells with inputs coupled to sensor cells above and below. The principal benefit of this alternative is that, assuming the same block cell density, in each column block, the maximum signal path length from the most remote sensor cells to the reader cell is one half the distance of that in the above described embodiment.

An image sensing array formed using a plurality of array blocks like the one depicted at 160, thus does not include interstitial rows of chip areas between the blocks. Instead, the interstitial areas are formed at the middle or Sth row ROW(s) in the middle of each block where each block includes "r" rows with r=2S−1. This embodiment thus also requires interpolation to fill in the data lost from the row of cells occupied by the reader cells. However, since the average distance between the optical sensing cells 64 and the block reader cell 66 of each block column is reduced, data signals communicated from optical sensing cells 64 to block reader cells 66 propagate over shorter distances via sensing nodes 161 and are therefore attenuated less thus further improving the signal to noise characteristics of the device.

Figure 9:
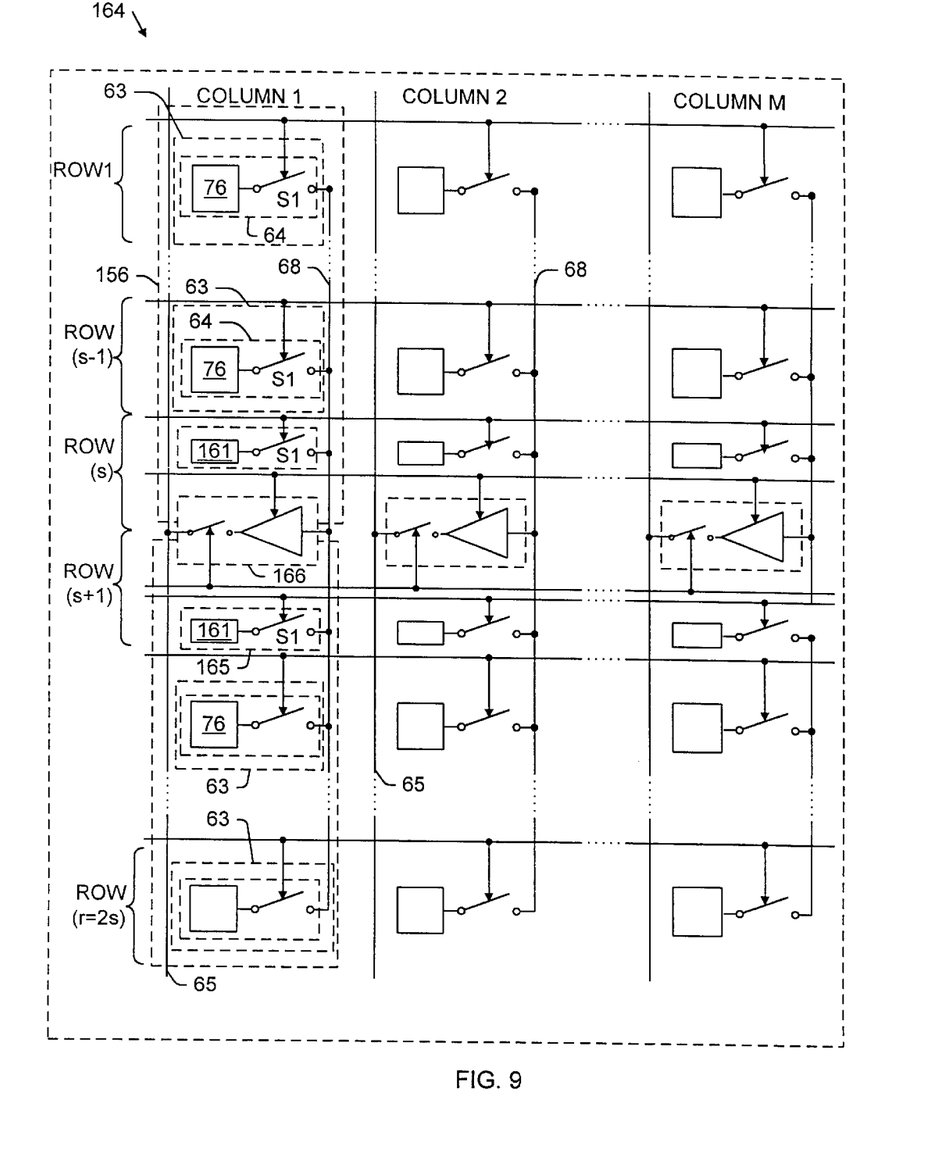
FIG. 9 is a schematic block diagram generally illustrating another alternative embodiment of a segmented image sensing array block according to the present invention.

FIG. 9 is a schematic diagram generally illustrating at 164 a further alternative embodiment of a segmented image sensing array block according to the present invention. This embodiment is similar to that of FIG. 8 in that reader cells 166 are disposed at the middle of the block 164 but differs in that there is no interstitial row of lost data. In this embodiment, partial area sensor cells 165 are configured on both sides of the reader cells 166 and share the space at the center of the block normally occupied by a row of optical sensing cells 64.

Partial data is obtained for each "cell area" of each of the two "center rows" by two rows of cells (Rows S and S+1). The partial area sensor cells have effective light sensing chip areas equal to one half the area of the normal sensing elements 76. This embodiment would operate in the same manner as that described above. This embodiment enables full reconstruction of image data by a simple bit line shift of row S and row S+1 data after analog to digital conversion. Thus no interpolation is required.

In general, partial area sensor cells may have effective light sensing chip areas equal to any fraction of the area of the normal sensing elements 76 and may obtain a proportional fraction of the data obtained by the normal sensing elements. Therefore, the size of an optical sensing cell may be varied to compensate for variations of light intensity caused by optical distortion. For example, if light incident upon an image sensing array has been passed through a lens, the intensity of the light incident on the array will vary with the distance between the center of the lens and the focal plane. In an embodiment, optical sensing cells at one extreme of the array are larger than optical sensing cells at an opposite extreme of the array and undergo a gradation in between so as to compensate for optical distortion.

Figure 10:
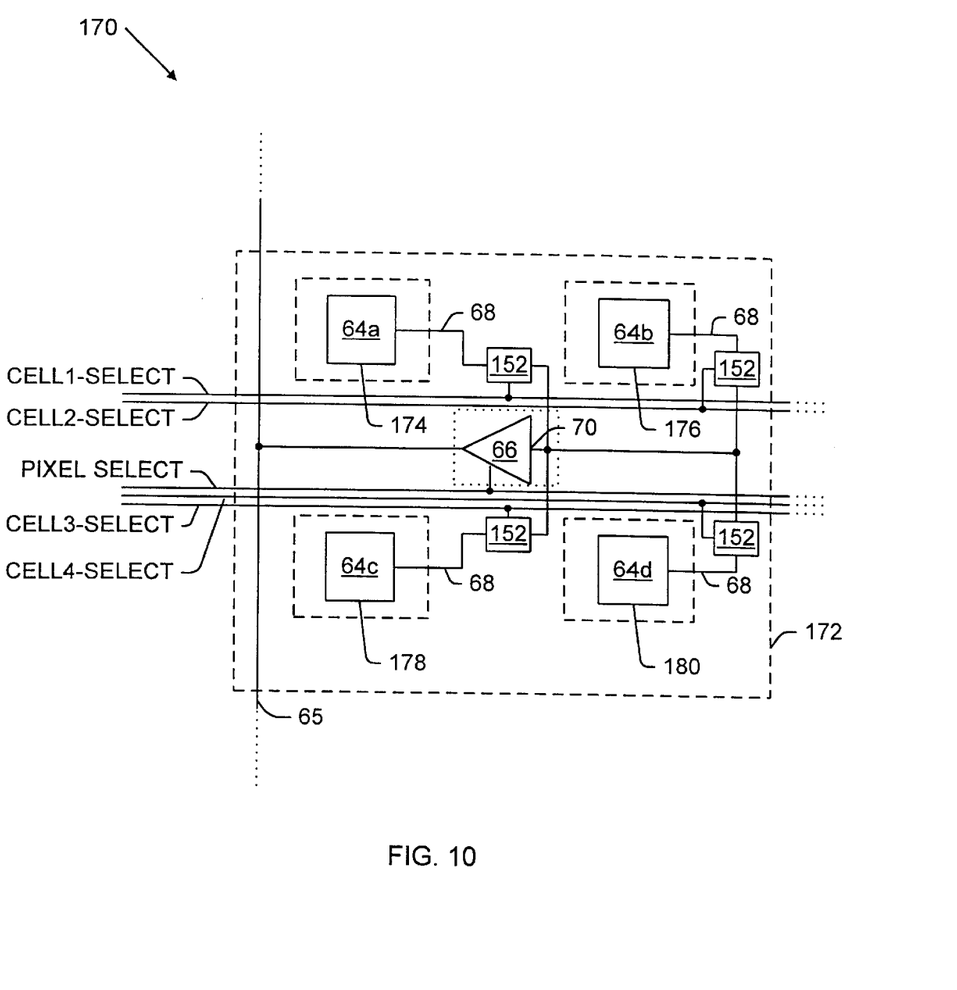
FIG. 10 is a schematic block diagram generally illustrating a segmented image sensing array block according to the present invention for use with a 2×2 periodic pattern filtering scheme.

FIG. 10 is a schematic block diagram generally illustrating a further alternative embodiment of an image sensing array sub-block at 170 in accordance with the present invention. The depicted four-cell image sensing array sub-block is specially adapted for use with a 2×2 periodic format color filter (not shown) respectively disposed above the array sub-block 170, as further described below. In the present invention, the color filter may be any additive or subtractive model type of color filter. In one embodiment, the color filter is a red-green-blue (RGB) filter. In another embodiment, the color filter is a cyan, magenta, yellow (CMY) filter.

An image sensing array formed by a plurality of the array sub-blocks depicted at 170 is similar to the image sensing array depicted at 151 (FIG. 7A) and the depicted dashed boxes and elements correspond to the like numbered chip areas and elements shown in FIG. 7A. In this embodiment of the present invention, a single reader cell is used to amplify data signals from multiple optical sensing cells forming a pixel 172 and includes a 2×2 array of optical sensing cells sharing a single reader cell 66.

The depicted array block includes: a first optical sensing cell 64a, disposed within an area 174 of pixel 172, for sensing a first component of pixel data; a second optical sensing cell 64b, disposed within an area 176 of pixel 172, for sensing a second component of pixel data; a third optical sensing cell 64c, disposed within an area 178 of pixel 172, for sensing a third component of pixel data; and a fourth optical sensing cell 64d, disposed within an area 180 of pixel 172, for sensing a fourth component of pixel data. In the embodiment using the RBG filter (not shown), the first, second, third, and fourth components of pixel data are red, green, green and blue components respectively.

The reader cell 66 is disposed within the center of the 2×2 array of optical sensing cells and there is no interstitial area in the depicted array block for which interpolation is necessary. A cell select switch 152 is provided for each of the four sensing cells 64a, 64b, 64c, and 64d for selectively coupling the corresponding sensing cell to the data input 70 of the reader cell 66. Each of the four switches 152 includes: a first terminal connected to a cell output of an optical sensing cell; a second terminal connected to the data input 70 of the block reader cell 66; and an actuating input for receiving a unique cell select signal CELLj-SELECT from the row decoder 44 (FIG. 7). A pixel select signal operated in concert with the cell select signals will allow all four cells to be read out to column line 65 in any desired sequence. For example, it may be desirable to read out all four bits of color component information together, or it may be more appropriate to read out the cells of the array on a row-by-row basis as described above.

The color filters (not shown), disposed above array block 170, filter light incident on pixel 172 such that: a first component of the light incident upon pixel 172 is directed to area 174 and sensed by cell 64a; a second component is directed to area 176 and sensed by cell 64b; a third component is directed to area 178 and sensed by cell 64c; and a fourth component is directed to area 180 and sensed by cell 64d. Any suitable process and materials may be used to provide light filtration during exposure of the array. For example, different filter materials may be lithographically deposited over the respective cells, or some type of multiple filter and mechanical exposure technique may be used. An advantage of the depicted image sensing array is that image data may be sensed, read out, and provided to processing components of the image detection system in a desirable color format which is easy to process.

In each of the embodiments described above, the image sensing arrays are comprised of an orthogonal matrix. However, it is anticipated that an alternative image sensing array in accordance with principles of the present invention may be comprised of an irregular matrix which is not orthogonal. For example, an image sensing array in accordance with principles of the present invention may be organized in rows that are circular in shape: or organized in a spiral configuration, with radially extending "columns access lines.".

While the present invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

We claim:

1. In an image detection system including an image sensing array of photosensor cells, a row decoder coupled to the cells by row address lines, and output processing means coupled to the cells by column bit lines for processing image data read out from the image sensing array, an improved image sensing array comprising:
   a semiconductive substrate having formed therein an array of discrete substrate areas organized in rows and columns, said array of areas being segmented into a plurality of blocks of said areas, each said block including a sub-array of said areas, at least one of said rows of each said block having at least one reader cell formed in an area thereof, the remaining rows of the block having photosensor cells formed in each area thereof, each column of each said block forming a column block including a plurality of said photosensor cells, and an associated node line communicatively coupling each said photosensor cell of the column block to an associated reader cell;
   a plurality of said row address lines formed on said substrate, each said row address line being communicatively coupled to each photosensor cell in a particular row of said array;
   a plurality of said column bit lines formed on said substrate, each said column bit line being communicatively coupled to at least one reader cell associated with a corresponding column block of said array; and
   a plurality of block select lines formed on said substrate, each said block select line being coupled to each reader cell in a particular row of said array containing reader cells,
   whereby in response to row select and block select inputs to said row address lines and said block select lines respectively, image data captured by each said photosensor cell is read out into said processing means, the image data captured by said photosensor cells in a particular column block being communicated to an associated column bit line through the reader cell associated therewith.

2. In an image detection system as recited in claim 1, wherein each said photosensor cell includes a photo-detecting circuit and a switching transistor, said switching transistor being responsive to an input applied to a corresponding one of said row address lines and operative to couple said photo-detecting circuit to a corresponding one of said node lines.

3. In an image detection system as recited in claim 2 and further comprising:
   a plurality of sensing cell reset lines, each of which is coupled to all of the optical sensing cells in a particular row of said sensing cells; and
   wherein each said photo-detecting circuit further includes,
      a photo-detecting transistor, and
      a sensing cell reset transistor responsive to an input applied to a corresponding one of said sensing cell reset lines and operative to provide a reset function to said photo-detecting transistor.

4. In an image detection system as recited in claim 2 wherein each said reader cell includes an amplifying transistor having its input connected to a corresponding node line and its output connected to a corresponding column bit line.

5. In an image detection system as recited in claim 1 wherein the row of cells in each said block containing said reader cells is a row disposed at one extreme of the sub-array forming the block of which it is a part.

6. In an image detection system as recited in claim 5 wherein the output processing means included within said system includes means for interpolating the data state of the image data supplanted by each reader cell of the array.

7. An image sensor for use in an image detection system, comprising: an m×n array of cells segmented into q blocks of (m/q)×n cells, each said block being divided into n column blocks of (m/q)−1 photosensor cells and a reader cell including an amplifying transistor having its input connected to a corresponding node line and its output connected to a corresponding column bit line, each said photo-sensor cell of each said column block being coupled by a node line to the input of the reader cell of the column block and including a photo-detecting transistor and a switching transistor being responsive to an input applied to a corresponding one of said row address lines and operative to couple said photo-detecting transistor to a corresponding-one of said node lines;

a plurality of row address lines respectively coupled to all photosensor cells in a corresponding row of said array;

a plurality of column block select lines respectively coupled to all reader cells in a corresponding row of said array; and a plurality of column bit lines respectively coupled to all reader cells in a corresponding column of said array, whereby in response to inputs applied to said:row address lines and said column block select lines, image data captured by the photo-sensor cells in each column block is output through the reader cell thereof to one of said column bit lines for serial input on a row-by-row basis to associated output processing means.

8. An image sensor as recited in claim 7 wherein each said reader cell further includes a switching transistor responsive to an input applied to one of said column block select lines and operative to connect the output of the associated amplifying transistor to a corresponding one of said column bit lines.

9. An image sensor as recited in claim 7 and further comprising:

a plurality of reset lines, each of which is coupled to all of the reader cells in a particular row of reader cells; and wherein each said reader cell further includes,
a reset transistor responsive to an input applied to a corresponding one of said reset lines and operative to provide a reset function to said amplifying transistor, and
a switching transistor responsive to a signal input to a corresponding block select line and operative to communicatively couple the output of said amplifying transistor to the corresponding column bit line.

10. An image sensor as recited in claim 7 and further comprising:

a plurality of sensing cell reset lines, each of which is coupled to all of the optical sensing cells in a particular row of said sensing cells; and wherein each said photo-detecting circuit further includes,
a photo-detecting transistor, and
a sensing cell reset transistor responsive to an input applied to a corresponding one of said sensing cell reset lines and operative to provide a reset function to said photo-detecting transistor.

11. An image sensor as recited in claim 7 wherein the row of cells in each said block containing said reader cells is a row disposed at one extreme of the sub-array forming the block of which it is a part.

12. An image sensor as recited in claim 7 wherein the output processing means included within said system includes means for interpolating the data state of the image data supplanted by each reader cell of the array.

* * * * *